(12) United States Patent
Geelen et al.

(10) Patent No.: US 9,857,222 B2
(45) Date of Patent: Jan. 2, 2018

(54) SPECTRAL CAMERA WITH MOSAIC OF FILTERS FOR EACH IMAGE PIXEL

(71) Applicant: IMEC, Leuven (BE)

(72) Inventors: Bert Geelen, Leuven (BE); Andy Lambrechts, Herent (BE); Klaas Tack, Buggenhout (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 14/267,758

(22) Filed: May 1, 2014

(65) Prior Publication Data

US 2015/0276478 A1    Oct. 1, 2015

Related U.S. Application Data

(63) Continuation of application No. PCT/EP2012/071509, filed on Oct. 30, 2012.
(Continued)

(51) Int. Cl.
| | |
|---|---|
| *G01J 3/26* | (2006.01) |
| *G01J 3/02* | (2006.01) |
| *G01J 3/28* | (2006.01) |

(52) U.S. Cl.
CPC . *G01J 3/26* (2013.01); *G01J 3/02* (2013.01); *G01J 3/0208* (2013.01);
(Continued)

(58) Field of Classification Search
CPC .................. G01J 3/2823; G01J 2003/2826
See application file for complete search history.

(56) References Cited

U.S. PATENT DOCUMENTS

| | | |
|---|---|---|
| 5,479,015 A | 12/1995 | Rudman et al. |
| 5,729,011 A | 3/1998 | Sekiguchi |
| | (Continued) | |

FOREIGN PATENT DOCUMENTS

| | | |
|---|---|---|
| CN | 101692456 | 4/2010 |
| WO | WO 2006/046898 | 5/2006 |
| | (Continued) | |

OTHER PUBLICATIONS

R Nave; "Stops, Pupils and Apertures"; http://hyperphysics.phy-astr.gsu.edu/hbase/geoopt/stop.html; printed 2016; pp. 1-9.*
(Continued)

*Primary Examiner* — Shawn Decenzo
(74) *Attorney, Agent, or Firm* — Knobbe Martens Olson & Bear LLP

(57) ABSTRACT

A spectral camera for producing a spectral output is disclosed. The spectral camera has an objective lens for producing an image, a mosaic of filters for passing different bands of the optical spectrum, and a sensor array arranged to detect pixels of the image at the different bands passed by the filters, wherein for each of the pixels, the sensor array has a cluster of sensor elements for detecting the different bands, and the mosaic has a corresponding cluster of filters of different bands, integrated on the sensor element so that the image can be detected simultaneously at the different bands. Further, the filters are first order Fabry-Perot filters, which can give any desired passband to give high spectral definition. Cross talk can be reduced since there is no longer a parasitic cavity.

8 Claims, 11 Drawing Sheets

Related U.S. Application Data

(60) Provisional application No. 61/556,066, filed on Nov. 4, 2011.

(52) U.S. Cl.
CPC .......... *G01J 3/0235* (2013.01); *G01J 3/0256* (2013.01); *G01J 3/0259* (2013.01); *G01J 3/2823* (2013.01); *G01J 2003/2826* (2013.01)

(56) References Cited

U.S. PATENT DOCUMENTS

| | | | |
|---|---|---|---|
| 5,923,036 | A * | 7/1999 | Tague et al. ............. 250/339.07 |
| 6,222,631 | B1 * | 4/2001 | Terauchi ....................... 356/419 |
| 6,459,425 | B1 * | 10/2002 | Holub et al. ................... 345/207 |
| 7,242,478 | B1 * | 7/2007 | Dombrowski et al. ....... 356/419 |
| 7,589,772 | B2 | 9/2009 | Coifman et al. |
| 7,835,002 | B2 | 11/2010 | Muhammed et al. |
| 2003/0048263 | A1 | 3/2003 | Wolters |
| 2010/0091286 | A1 * | 4/2010 | Dahlgren ..................... 356/416 |
| 2010/0182598 | A1 | 7/2010 | Choi et al. |
| 2011/0170098 | A1 | 7/2011 | Normand |
| 2012/0002202 | A1 * | 1/2012 | Chrisp .......................... 356/328 |

FOREIGN PATENT DOCUMENTS

| | | | | |
|---|---|---|---|---|
| WO | WO 2008/012715 | | 1/2008 | |
| WO | WO 2011/064403 | | 6/2011 | |
| WO | WO 2011064403 | * | 6/2011 | ............... G01J 3/26 |

OTHER PUBLICATIONS

Onat, Bora M., Gary Carver, and Mark Itzler. "A solid-state hyperspectral imager for real-time standoff explosives detection using shortwave infrared imaging." SPIE Defense, Security, and Sensing. International Society for Optics and Photonics, 2009.*

Geelen1a, Bert, Nicolaas Tacka, and Andy Lambrechtsa. "A snapshot multispectral imager with integrated, tiled filters and optical duplication."Proc. of SPIE vol. vol. 8613. 2013.*

International Search Report dated Mar. 1, 2013 in International Application No. PCT/EP2012/071509.

Eichenholz et al., "Ultracompact Fully Integrated MegaPixel MultiSpectral Imager," Integrated Optics: Devices, Materials, and Technologies XIII, SPIE vol. 7218, 2009, pp. 721814-1 to 721814-10.

Haidar et al., "Free-standing Subwavelength Metallic Gratings for Snapshot Multispectral Imaging," Applied Physics Letters 96, American Institute of Physics, Jun. 2, 2010, pp. 221104-1 to 221104-3.

Mathews, "Design and Fabrication of a Low-Cost, Multispectral Imaging System," Applied Optics, Oct. 1, 2008, vol. 47, No. 28, pp. F71-F76.

Nayar et al., "Assorted Pixels: Multi-sampled Imaging with Structural Models," ECCV 2002, LNCS 2353, 2002, pp. 636-652.

Bass et al., Handbook of Optics vol. I—Fundamentals, Techniques, and Design, 2nd Ed., Section 1.18 ("Apertures, Pupils, Stops, Fields and Related Matters"), 1995, pp. 1.80-1.83, McGraw-Hill.

Smith, Warren J., Modern Optical Engineering: The Design of Optical Systems, 4th Ed., Chapter 9 ("Stops, Apertures, Pupils and Diffraction"), 2008, pp. 175-177, McGraw-Hill.

* cited by examiner

FIG 1

OBJECTIVE
LENS 10

MOSAIC OF FABRY
PEROT FILTERS 30
HAVING DIFFERENT
PASSBANDS, ONE FOR
EACH SENSOR
ELEMENT

IMAGE PROJECTED ON
SENSOR ARRAY, AT
SLIGHTLY LOWER
SPATIAL RESOLUTION
THAN THE PITCH OF THE
SENSOR ELEMENTS SO
THAT A CLUSTER OF
SENSOR ELEMENTS IS
EVENLY ILLUMINATED
BY ONE IMAGE PIXEL

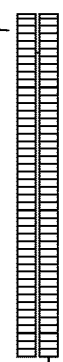

SENSOR ARRAY
40 HAVING
CLUSTER OF
SENSOR
ELEMENTS FOR
EACH IMAGE
PIXEL

READ OUT OF
DETECTIONS AT
MANY BANDS
FOR EACH IMAGE
PIXEL

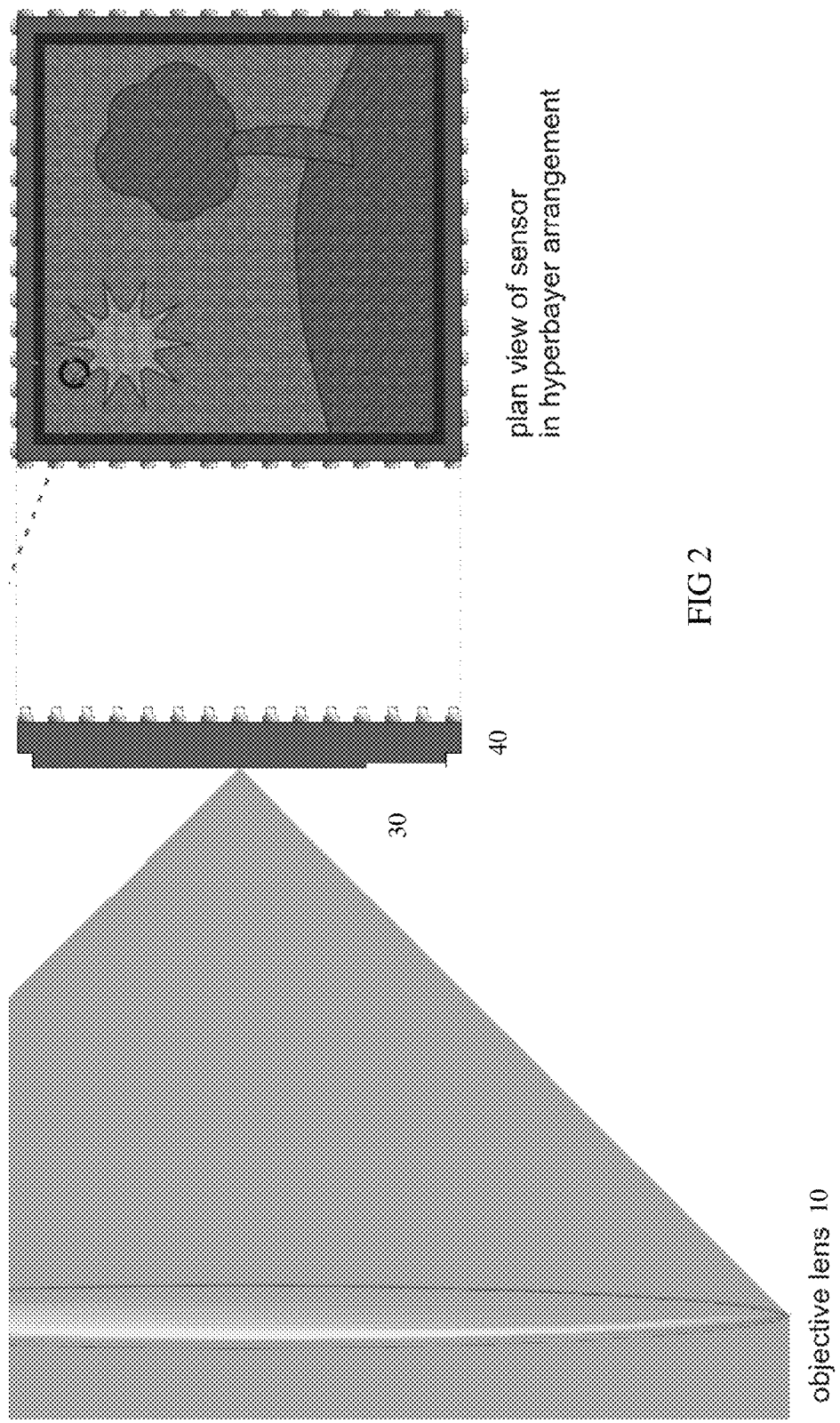

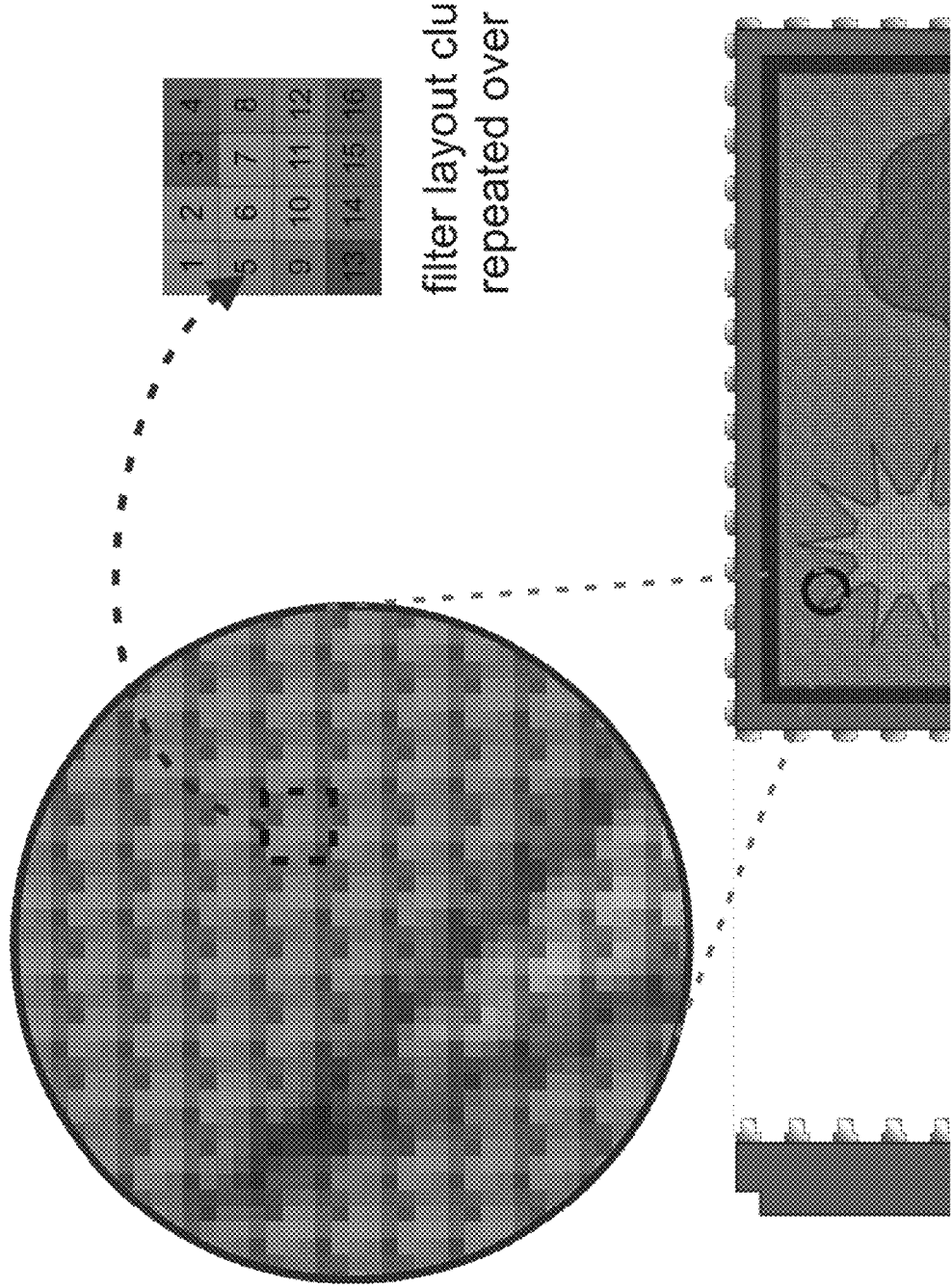

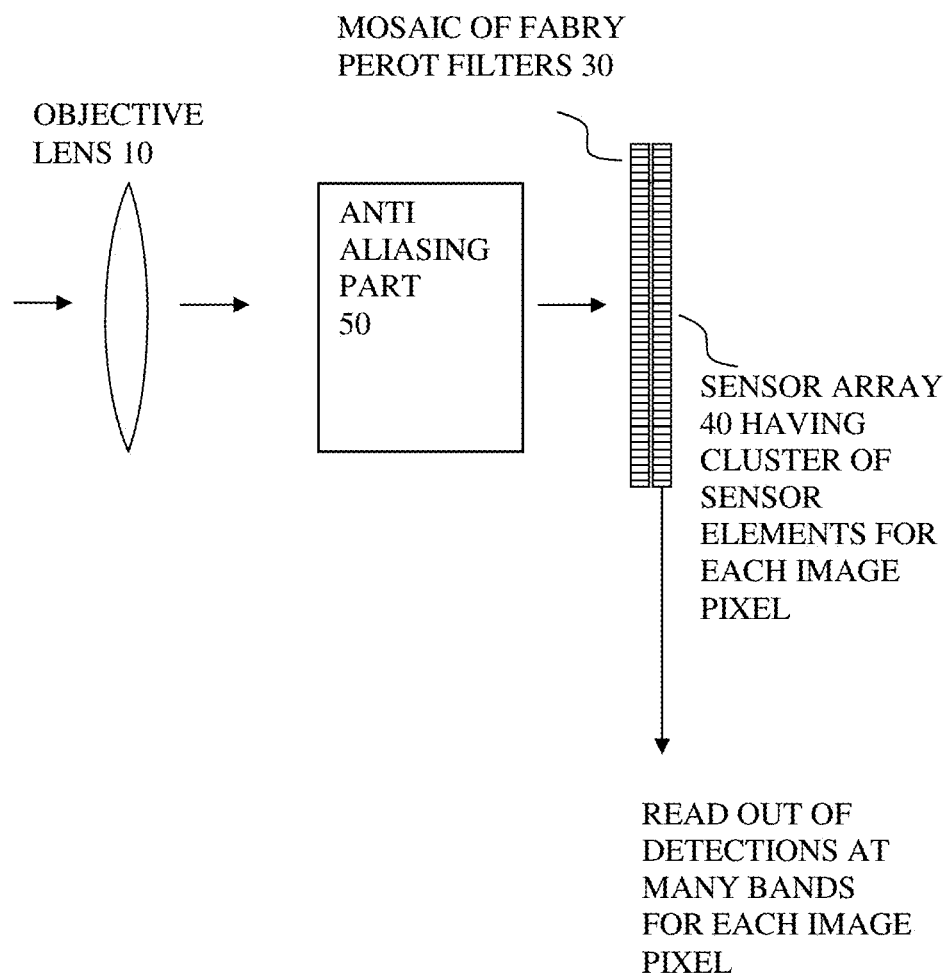

OBJECTIVE LENS 10

MOSAIC OF FABRY PEROT FILTERS 30 HAVING SOME BANDS SELECTED FOR DETECTION OF UNWANTED ORDERS

SENSOR ARRAY 40 HAVING CLUSTER OF SENSOR ELEMENTS FOR EACH IMAGE PIXEL

PIVOT 41

SWAPPABLE SENSOR AND INTEGRATED FILTER ARRAY 42

Layout basis repeated over sensor

Band selection:
1  500nm
2  550nm
3  600nm
4  650nm
5  665nm
6  670nm
7  685nm
8  700nm
9  750nm

SELECTION OF BANDS REPEATED
OVER PERIPHERAL PART OF SENSOR ARRAY

DIFFERENT SELECTION OF BANDS REPEATED
OVER CENTRAL PART OF SENSOR ARRAY filter layout cluster
repeated over entire sensor

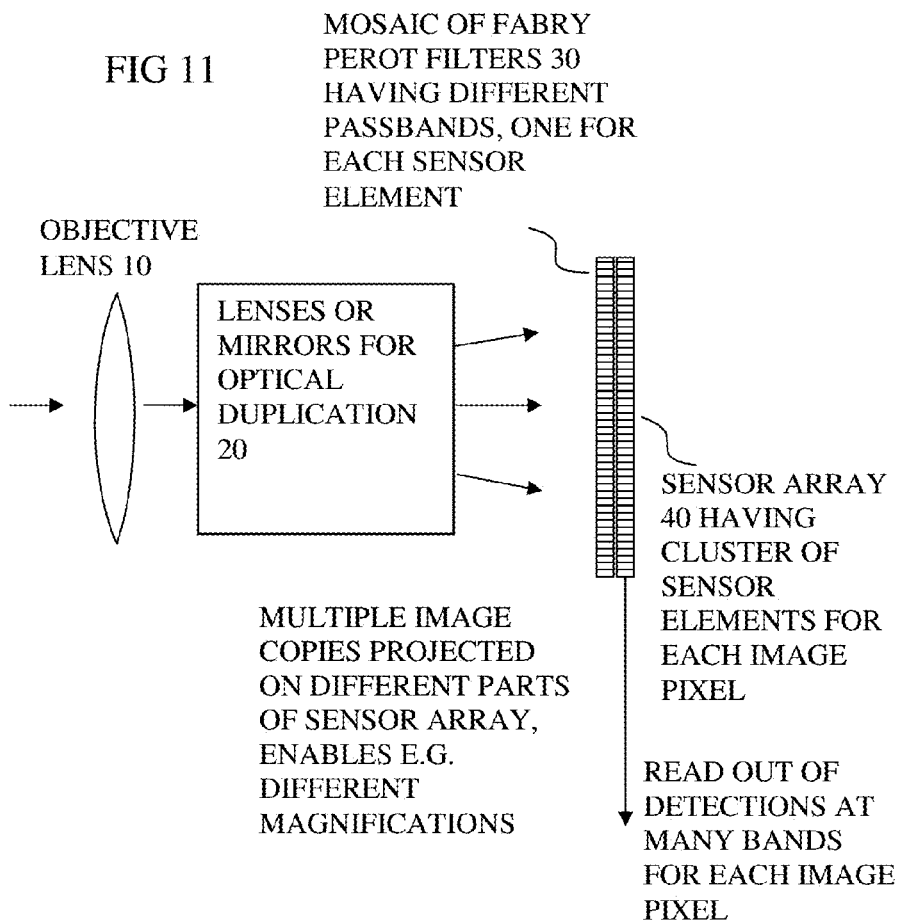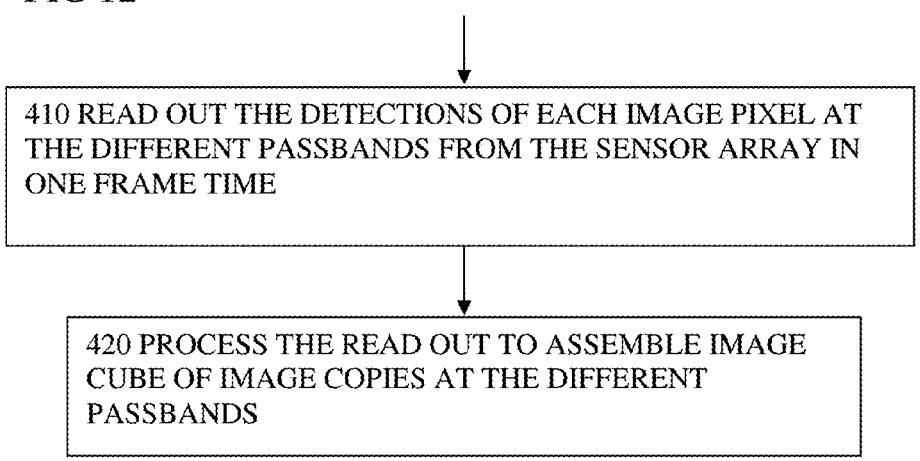

FIG 13

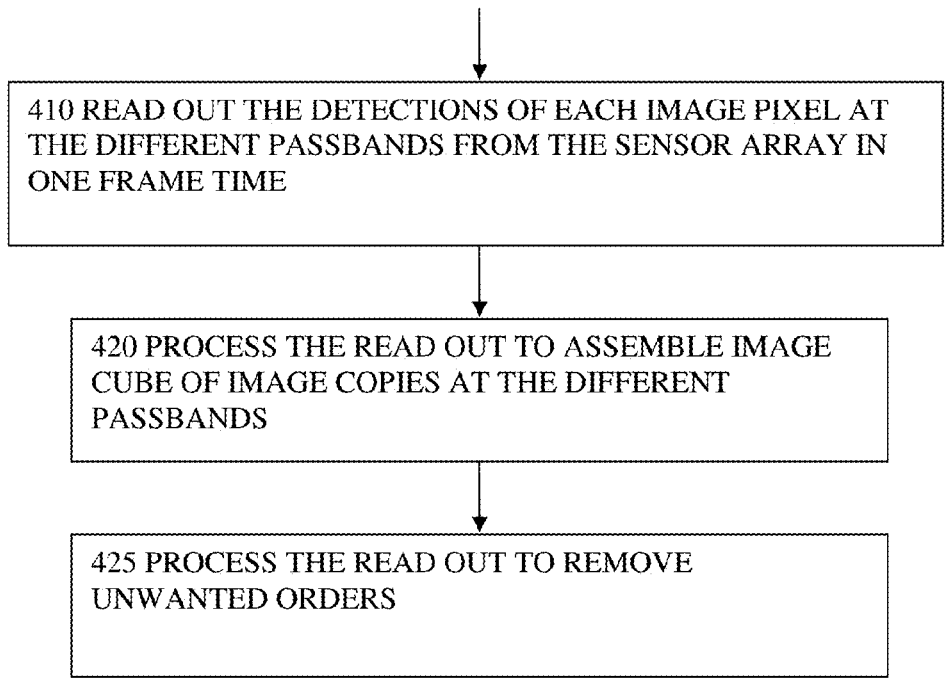

410 READ OUT THE DETECTIONS OF EACH IMAGE PIXEL AT THE DIFFERENT PASSBANDS FROM THE SENSOR ARRAY IN ONE FRAME TIME

420 PROCESS THE READ OUT TO ASSEMBLE IMAGE CUBE OF IMAGE COPIES AT THE DIFFERENT PASSBANDS

425 PROCESS THE READ OUT TO REMOVE UNWANTED ORDERS

FIG 14

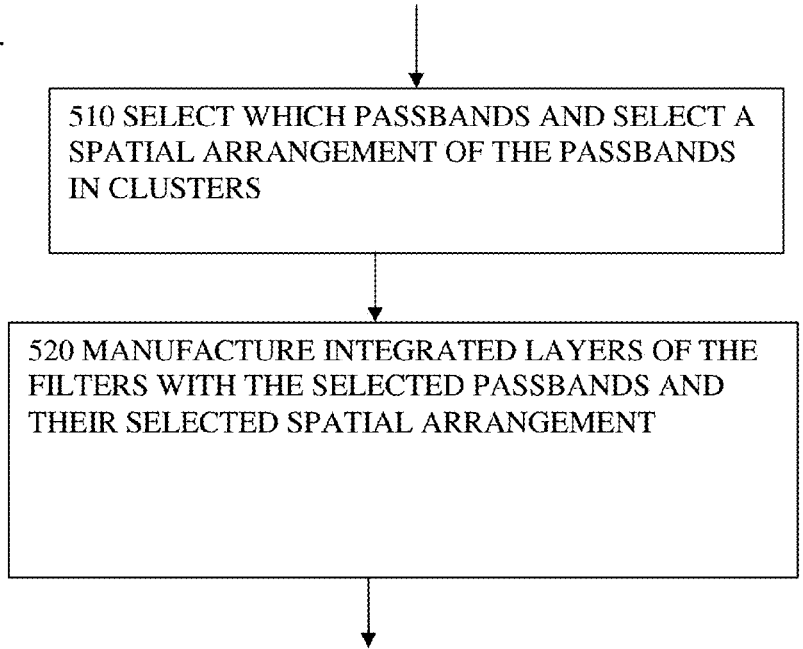

510 SELECT WHICH PASSBANDS AND SELECT A SPATIAL ARRANGEMENT OF THE PASSBANDS IN CLUSTERS

520 MANUFACTURE INTEGRATED LAYERS OF THE FILTERS WITH THE SELECTED PASSBANDS AND THEIR SELECTED SPATIAL ARRANGEMENT

FIG 15

515 SELECT WHICH PASSBANDS AND SELECT SPATIAL ARRANGEMENT OF THE PASSBANDS TO GIVE VARIATION OF WHICH PASSBANDS ARE DETECTED IN DIFFERENT PARTS OF THE IMAGE CUBE, OR VARIATION OF SPATIAL OR SPECTRAL RESOLUTION OF THE DETECTION IN DIFFERENT PARTS OF THE IMAGE CUBE.

520 MANUFACTURE FILTERS WITH THE SELECTED PASSBANDS AND THEIR SELECTED SPATIAL ARRANGEMENT

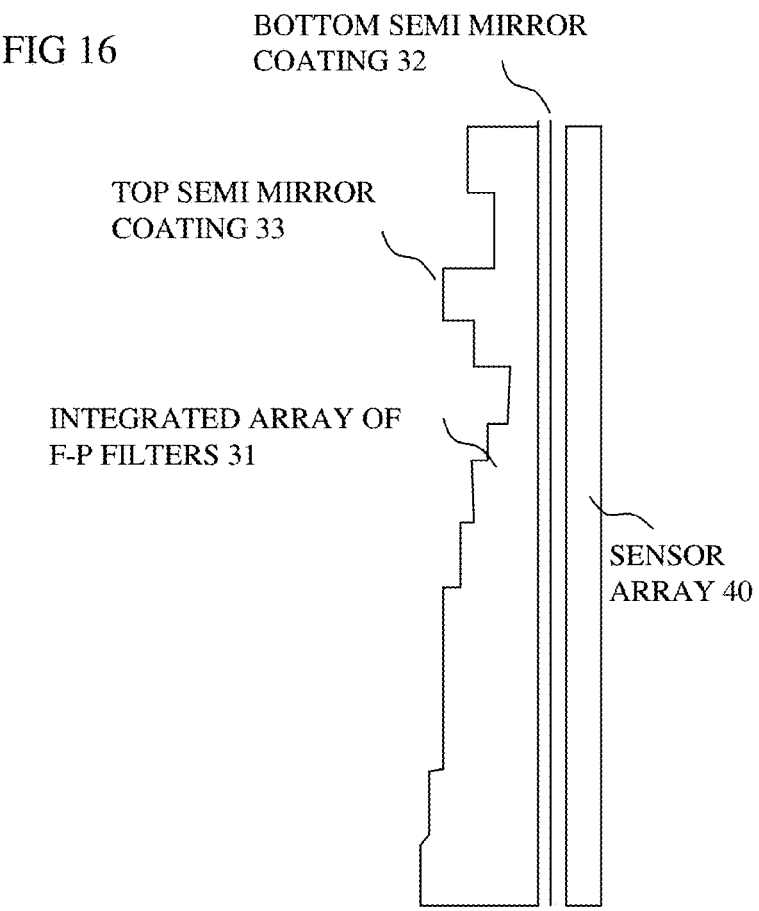

FIG 16

BOTTOM SEMI MIRROR COATING 32

TOP SEMI MIRROR COATING 33

INTEGRATED ARRAY OF F-P FILTERS 31

SENSOR ARRAY 40

SPECTRAL CAMERA WITH MOSAIC OF FILTERS FOR EACH IMAGE PIXEL

CROSS REFERENCE TO RELATED APPLICATIONS

This application is a continuation of PCT Application No. PCT/EP2012/071509, filed Oct. 30, 2012, which claims priority under 35 U.S.C. §119(e) to U.S. Provisional Patent Application No. 61/556,066, filed Nov. 4, 2011. Each of the above applications is hereby incorporated by reference in its entirety.

BACKGROUND

Technological Field

The present invention relates to spectral cameras, to methods of configuring such cameras, and to methods of operating such cameras.

Description of the Related Technology

Spectral cameras are known and some are referred to as multi spectral or hyperspectral imaging systems.

Hyperspectral imaging refers to the imaging technique of collecting and processing information from across the electromagnetic spectrum. Whereas the human eye only can see visible light, a hyperspectral imaging system can see visible light as well as from the ultraviolet to infrared. Hyperspectral sensors thus look at objects using a larger portion of the electromagnetic spectrum.

Certain objects leave unique "fingerprints" across this portion of the electromagnetic spectrum. These "fingerprints" are known as spectral signatures and enable identification of the materials that make up a scanned object. The hyperspectral capabilities of such an imaging system enable to recognize different types of objects, all of which may appear as the same color to the human eye.

Whereas multispectral imaging deals with several images at discrete and somewhat narrow bands, hyperspectral imaging deals with imaging narrow spectral bands over a contiguous spectral range. It can produce the spectra for all pixels in the scene. While a sensor with 20 discrete bands covering the VIS, NIR, SWIR, MWIR, and LWIR would be considered multispectral, another sensor with also 20 bands would be considered hyperspectral when it covers the range from 500 to 700 nm with 20 10-nm wide bands.

Hyperspectral sensors collect information as a set of "images." Each image represents a range of the electromagnetic spectrum and is also known as a spectral band. These images each have two spatial dimensions and if images of a series of different spectral bands are effectively stacked to form a cube, then the third dimension can be a spectral dimension. Such a three dimensional hyperspectral cube is a useful representation for further image processing and analysis. The precision of these sensors is typically measured in spectral resolution, which is the width of each band of the spectrum that is captured. If the scanner picks up on a large number of fairly narrow frequency bands, it is possible to identify objects even if said objects are only captured in a handful of pixels. However, spatial resolution is a factor in addition to spectral resolution. If the pixels are too large, then multiple objects are captured in the same pixel and become difficult to identify. If the pixels are too small, then the energy captured by each sensor-segment is low, and the decreased signal-to-noise ratio reduces the reliability of measured features.

Current hyperspectral cameras produce a hyperspectral datacube or image cube, consisting of a stack of 2D images in the x-y plane of the scene in which each image of the stack contains information from a different frequency or spectral band. The spectral range that is captured is not limited to visual light, but can also span Infra Red (IR) and/or Ultra Violet (UV). The 3D Image Cube is captured by a hyperspectral imager, using an array of sensors that is inherently a 2D sensor. Therefore some form of scanning can be used, so that the cube is assembled over a number of frame periods.

Line scanners or pushbroom systems thus capture a single line of the 2D scene in all spectral bands in parallel. To cover all spatial pixels of the scene, this type of system then scans different lines over time, for example by relative movement of the scanner and the scene. Starers or staring systems capture the complete scene in a single spectral band at a time with a 2D array of sensors and scan over different spectral bands in order to produce the 3D hyperspectral image cube.

It is known from the article entitled *Design and fabrication of a low-cost, multispectral imaging system* by Scott A. Mathews to provide optical duplication onto an array of sensors. Cross talk between image copies is limited by a physical barrier which covers some of the sensor elements.

Another known device using such optical duplication is a "miniature snapshot multispectral imager" by Infotonics technology center. Again this avoids cross talk by having walls between the image copies on the sensor array.

SUMMARY OF CERTAIN INVENTIVE ASPECTS

An object of the invention is to provide improved apparatuses or methods.

A first aspect provides an integrated circuit for an imaging system as set out in independent claim 1. This provides a spectral camera for producing a spectral output and having an objective lens for producing an image, a mosaic of filters for passing different bands of the optical spectrum, and one or more sensor arrays arranged to detect pixels of the image at the different bands passed by the filters, wherein for each of the pixels, the one or more sensor arrays has a cluster of sensor elements for detecting the different bands, and the mosaic has a corresponding cluster of filters of different bands each filter being integrated on one of the sensor elements so that the image can be detected simultaneously at the different bands to provide the spectral output, wherein the filters are Fabry-Perot filters. An effect of the filters being integrated Fabry-Perot type is that they can be designed and manufactured to give any desired passband and to give particularly narrow passbands if desired to give high spectral definition. Such parameters depend largely on the thickness of the integrated layers forming the cavities and the precision of the thickness. Furthermore, by integrating the filters on the sensor array, cross talk can be reduced since there is no longer a parasitic cavity between the filters and the sensor array, and alignment of filters to sensors can be achieved more easily.

Any additional features can be added or disclaimed, and some are described in more detail below. In some cases at least some of the Fabry Perot filters can be first order filters. The first order operation can give better narrowband spectral shape, better reflection control, and less dependence on angle of incidence for example.

In some cases the spectral camera can have an optical anti aliasing part before the filters for homogenizing the light reaching the different filters of a respective cluster. This can help avoid unwanted image artifacts caused by the sensors of a given cluster being at slightly different locations.

The anti aliasing part can comprise any one or more of: birefringent filters extending over more than 2×2 of the sensor elements, a defocused objective lens with a matched aperture stop, and a degraded objective lens.

Some of the clusters can have one or more additional sensor elements and corresponding filters arranged to detect bands corresponding to unwanted higher or lower order spectral response of another of the filters. This enables such leakage to be compensated later, to enable more accurate spectral detection performance, or to enable the other filters to have more relaxed specifications or tolerances, to reduce costs for example.

The selections of bands in some of the clusters can be arranged so that there is variation in any one or more of: which passbands are detected at different parts of the image, spectral range at different parts of the image, spectral resolution, spatial resolution at different parts of the image, and spatial resolution at different passbands. This can enable color balancing or can enable different parts of the resulting image cube to have higher or lower densities in spatial or spectral directions for example.

The spectral camera can be arranged such that the array of filters is reconfigurable in use by swapping the array of filters integrated on the sensor array to use a different sensor array having a different array of filters. This can enable adapting to different applications needing different spectral bands or different spatial arrangement of the filters.

The spectral camera can have an optical duplicator part for projecting multiple image copies onto different parts of the sensor array. This can enable more flexibility in trading off spectral resolution and spatial resolution.

Another aspect provides a method of operating a spectral camera to produce a spectral output, the camera having an objective lens for producing an image, a mosaic of filters for passing different bands of the optical spectrum, and one or more sensor arrays arranged to detect pixels of the image at the different bands passed by the filters, wherein for each of the pixels, the one or more sensor arrays has a cluster of sensors for detecting the different bands, and the mosaic has a corresponding cluster of filters of different bands integrated on the sensors so as to provide each of the sensors with their respective one of the different bands so that the image can be detected simultaneously at the different bands, wherein the filters are Fabry-Perot filters, the method having the steps of: reading out the detections of the image pixels at the different bands from the sensor array, and processing the read out to assemble detected image copies for each of the bands.

There can be a step of processing the read out to detect unwanted orders and to remove them.

Another aspect provides a method of configuring a spectral camera during manufacture, the spectral camera having an objective lens for producing an image, a mosaic of filters for passing different bands of the optical spectrum, and one or more sensor arrays arranged to detect pixels of the image at the different bands passed by the filters, wherein for each of the pixels, the one or more sensor arrays has a cluster of sensors for detecting the different bands, and the mosaic has a corresponding cluster of filters of different bands integrated on the sensors so as to provide each of the sensors with their respective one of the different bands so that the image can be detected simultaneously at the different bands, wherein the filters are Fabry-Perot filters, the method having the steps of: selecting which passbands to use and selecting their spatial arrangement for the clusters, and making the integrated filters by forming layers on the sensor arrays according to the selected passbands and their spatial arrangement.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 1 shows a schematic view of a spectral camera according to an embodiment,

FIGS. 2 and 3 show schematic views of a spectral camera according to another embodiment, FIG. 4 shows a schematic view of part of a camera with an anti-aliasing part, FIG. 11 shows a camera according to an embodiment having multiple image copies, FIGS. 12 and 13 show steps in methods of operation of the cameras, FIGS. 14 and 15 show steps in methods of configuring such cameras during manufacture, and FIG. 16 shows a cross section view of a sensor array integrated with an array of Fabry Perot filters.

DETAILED DESCRIPTION

Figure 5:
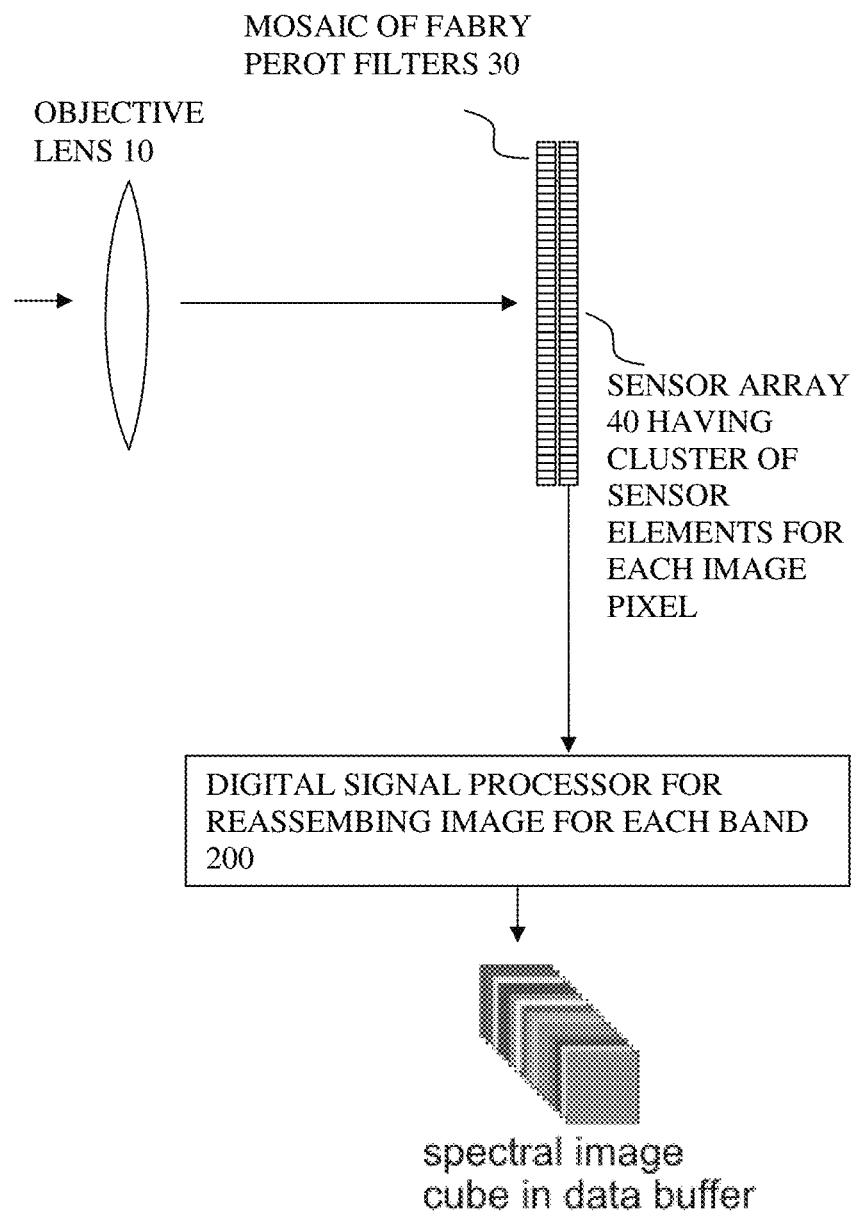
FIGS. 5 and 6 show schematic views of a spectral camera according to another embodiment with processing of the read out.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an," "the," this includes a plural of that noun unless something else is specifically stated.

The term "comprising," used in the claims, should not be interpreted as being restricted to the means listed thereafter; it does not exclude other elements or steps.

Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to optical are intended to encompass at least wavelengths within the human visible wavelength range and also infra red wavelengths, and shorter wavelengths, extending into the ultra violet bands, where the sensitivity to manufacturing variations in thickness of the optical filter are even more pronounced. In some embodiments, the optical filters and optical sensors can be limited to a range which is any subset of these wavelengths, for example visible wavelengths only, or visible and shorter wavelengths.

References to arrays of optical filters or arrays of optical sensors are intended to encompass 2-dimensional arrays, rectangular or non rectangular arrays, irregularly spaced arrays, and non planar arrays for example.

References to integrated circuits are intended to encompass at least dies or packaged dies for example having the array of optical filters monolithically integrated onto the array of sensors.

References to a spectrum of wavelengths are intended to encompass a continuous spectrum or a range of nearly adjacent discrete bands for example.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the teens top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments

Hyperspectral imaging systems or cameras can consist of different discrete components, e.g. the optical sub-system for receiving the incoming electromagnetic spectrum, the array of filters for creating the different bands within the received spectrum and the image sensor array for detecting the different bands. The optical sub-system can consist of a single or a combination of different lenses, apertures and/or slits. The array of filters can consist of one or more prisms, gratings, optical filters, acousto-optical tunable filters, liquid crystal tunable filters etc. or a combination of these.

A feature of spectral imaging is that, because an entire spectrum is acquired at each point, the operator needs no prior knowledge of the sample, and post-processing allows all available information from the dataset to be mined. Disadvantages are cost and complexity. Fast computers, sensitive detectors, and large data storage capacities are needed for analyzing hyperspectral data. Significant data storage capacity is necessary since hyperspectral cubes are large multi-dimensional datasets, potentially exceeding hundreds of megabytes.

Sensing spectral information is typically achieved either using dispersive optical elements or spectral filters. Dispersive optical elements such as prisms or gratings have limited light throughput and require time-consuming spatial scanning over multiple frames, as they sense only 1 spectral and 1 spatial dimension at a time. Spectral filters capture only 2 spatial dimensions (width W and height H) at one wavelength and thus require spectral scanning over multiple frames, requiring significant amounts of time due to the large switching overhead.

In order to capture NB wavelengths using standard optics, the scene still needs to be scanned spatially in front of the sensor over NB frames such that each position is sensed using NB different filters. Acquiring the full cube in one frame period thus requires mapping all 3 dimensions of the cube on the 2 dimensions of the sensor, or likewise, each spatial point should somehow be duplicated NB times over the sensor array, such that the NB different spectral samples are sensed.

FIG. 1, Spectral Camera According to an Embodiment

Embodiments as described below can now enable higher-speed acquisition of the 3D HSI cube to enable snapshot imaging, by mapping each point in the W×H×NB-sized cube (where NB is the number of passbands) to a sensor element on the sensor array more efficiently. Each of the W×H spatial points sensed in the scene is optically spread on the sensor array over a cluster of sensor elements each having a different filter passband. Due to the limited space on the sensor array, there will usually be a trade-off between spatial and spectral resolution.

FIG. 1 shows a schematic view of a camera according to an embodiment. An objective lens 10 projects an image onto a sensor array 40. An array of filters 30 is integrated on the sensor array. The sensor array has a cluster of sensor elements for each image pixel. The filters are arranged as a mosaic of different bands, one for each sensor element. Hence there are clusters of filters. The arrangement can be regarded as a hyperbayer arrangement. It enables image copies at different bands to be detected without the need for lenses for duplicating the image. The image can be projected on the sensor array at a slightly lower spatial resolution than the pitch of the sensor elements so that a cluster of sensor elements is evenly illuminated by one image pixel. This avoids aliasing if needed. In some cases aliasing may be tolerated without trying to avoid it.

It is desirable to have the array of filters integrated with the image sensor array. This integrated component or module can be combined with an optical sub-system to form a complete camera system. The sensor array is typically an integrated circuit with a monolithically integrated array of filters, and can be referred to as a spectral unit. The problem of long acquisition time can be partially overcome using high light throughput integrated filters formed for example by a HSI wedge technology as set out in International Patent Publication No. WO2011064403, entitled "Integrated circuit for spectral imaging system" and assigned to IMEC. Practical commercial implementations of such cameras should be compact, be capable of manufacture at low cost, and be reconfigurable. In certain aspects, process technology aspects are combined with the system integration and image processing techniques to alleviate the integrated circuit manufacturing process requirements.

FIG. 2, Spectral Camera According to Another Embodiment

FIG. 2 shows a schematic view of a spectral camera according to another embodiment, similar to that of FIG. 1 and showing a particular implementation with more detailed representation of the light paths. There is also a plan view of an arrangement of the mosaic of filters showing there is a single image, yet since each pixel is detected by a cluster of sensor elements of different bands, multiple image copies can be produced. From the sensor array the multiple values for each image pixel at different bands can be detected, read out and stored as a reassembled image cube in a data buffer. As before there is an objective lens 10 projecting an image without optical duplication lenses onto the sensor array 40.

Some practical effects of the arrangement shown are as follows: The objective lens can enable zooming, light throughput and refocusing flexibility. It is compatible with standard lens mounts, and full sensor usage is theoretically possible.

FIG. 3, Magnified View of Part of the Sensor Array

FIG. 3 shows a magnified view of part of the sensor array of FIG. 2. This shows a portion of the sensor array with integrated filters showing a repeated pattern of clusters of different bands. An example of one cluster is shown magnified further. For one image pixel there is a block of 16 filters of different bands arranged in 4 rows with bands 1-4, 5-8, 9-12 and 13-16 respectively.

FIG. 4, Another Embodiment Having an Anti Aliasing Part

FIG. 4 shows a schematic view of another example of a camera similar to that of FIG. 1. An anti aliasing part 50 is located in the optical path to carry out the spreading of each image pixel over a cluster on the sensor array. This can be implemented in various ways, such as optical filtering, or defocussing of the objective lens and so on.

FIG. 5, Processor for Reassembling the Image

FIG. 5 shows a schematic view of a spectral camera according to another embodiment similar to that of FIG. 1 with the addition of a processor 200 for reassembling the image for each band, after read out of the sensor array and for using inter-band prediction mechanisms, to estimate spectral data at a higher spatial resolution than the spatial cluster frequency. The processor can be incorporated into the camera or can be part of an external image processing system for example. This could be used to reassemble the images for each band read out from the sensor array for the arrangement of filters represented in FIG. 3. The processor can be implemented in the form of an address generator for a data buffer, arranged so that as the sensor array is read out into the data buffer, suitable addresses are generated to store the parts of the image for one band in addresses corresponding to a single frame.

Figure 6:
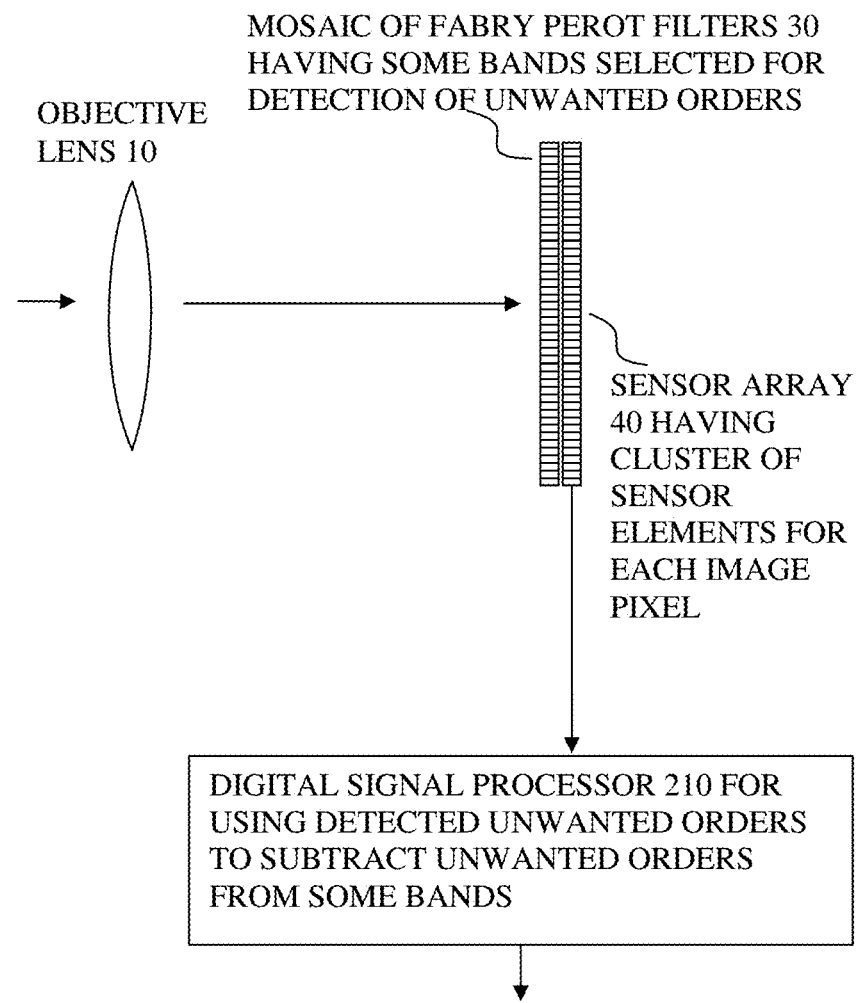

FIG. 6, Processor for Order Removal

FIG. 6 shows a schematic view of a spectral camera according to another embodiment similar to that of FIG. 1 with the addition of a processor 210 for order removal. This is useful if the selection of filter bands includes some extra bands arranged to coincide with unwanted second order or other order spectral response of other filters in the same cluster or a nearby cluster. Then the extra passbands can be used to detect the amount of the unwanted signal, and this can be subtracted from the values read out from the sensor elements which are intended to give a first order value but which also have the unwanted second order signal. In some cases, the sensors are inherently insensitive to higher order wavelengths, for example except for bands in a range 800 to 1000 nm, so in many cases not all the bands are susceptible. The processor can be incorporated into the camera or can be part of an external image processing system for example.

Figure 7:
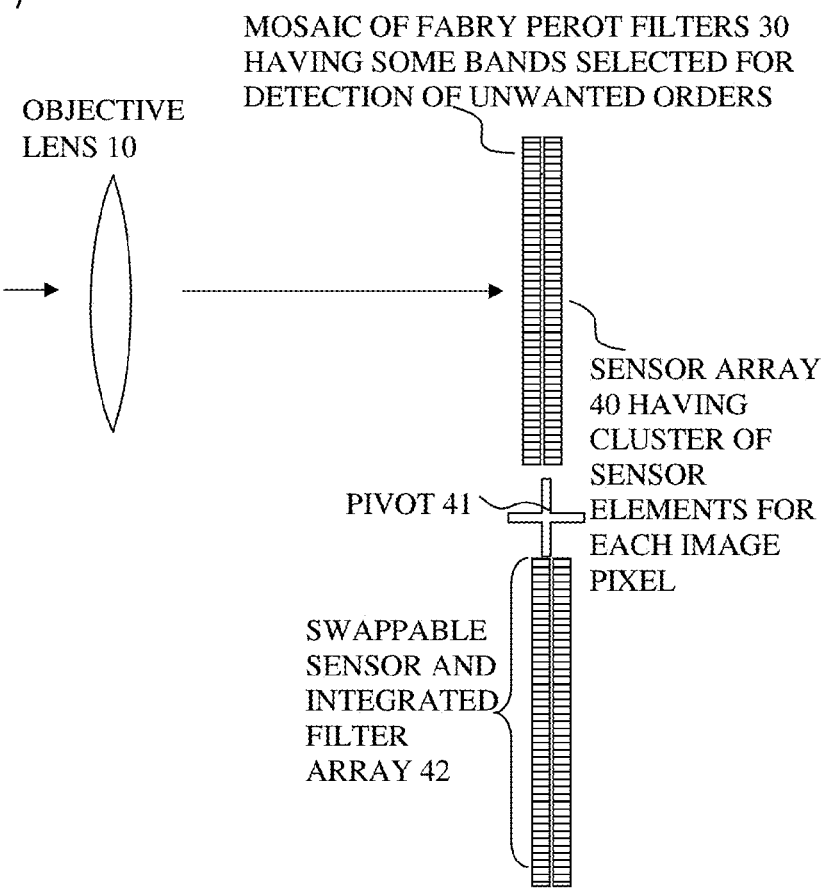
FIG. 7 shows a schematic view of a spectral camera according to another embodiment with a swappable sensor array with integrated filters.

FIG. 7, Swappable Sensor Array to Change Integrated Filters

FIG. 7 shows a schematic view of a spectral camera according to another embodiment similar to that of FIG. 1 and with a swappable sensor array 42 with integrated filters. In this case the swapping can be implemented by rotating the swappable sensor array about a pivot 41, so that it takes the position of the original sensor array 40. In principle other arrangements are conceivable. For example the optical path could be moved to the swappable sensor array rather than moving the sensor array, or the swappable array could be slid rather than rotated. Any number of different sensor arrays could be fixed to the pivot. In some cases, if needed, an optical duplicator such as a lens array as shown in FIG. 11 could also be swapped if needed, so that the layout of image copies or their magnifications could be changed.

Figure 8:
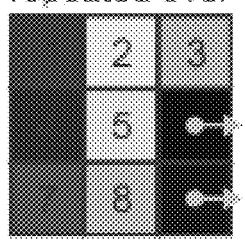
FIGS. 8 to 10 show views of different arrangements of passbands.
Figure 9:
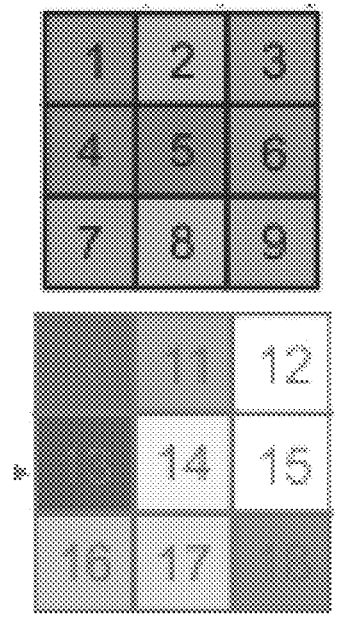
Figure 10:
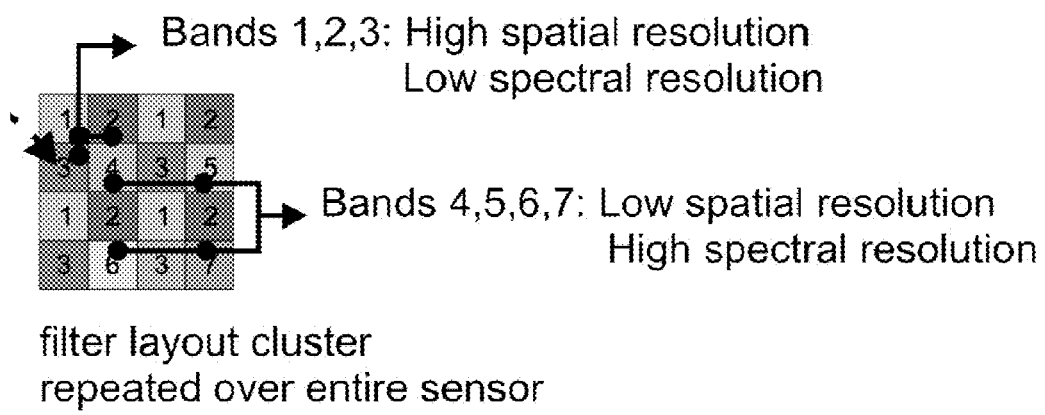

FIGS. 8 to 10, Other Examples of Passband Patterns

FIG. 8 shows an example of a cluster of filters with 3 rows of 3 different passbands labeled 1 to 9. The passband center values are listed for each band. This differs from the example of FIG. 3 in the size of the cluster and that in this case the bands have been selected to give a variation in spectral resolution for different bands. The difference between adjacent bands is 50 nm except for bands 4, 5, 6, 7 and 8 where the difference between adjacent bands is 15 nm or less for example. This gives better spectral resolution in this part of the spectrum.

FIG. 9 shows another example similar to that of FIG. 8 except that in this case there are two types of clusters. A first has bands selected for the periphery of the image using bands 1, 2, 3, 4, 5, 6, 7, 8, 9, while different bands are chosen for the central part of the image, labeled as bands 10 to 18. So this is an example of variation of bands selected at different parts of the image.

FIG. 10 shows an example similar to that of FIG. 8 except that the cluster has a two by two pattern but alternate clusters differ in their selection of bands, so the repeat is of a four by four pattern. There are seven bands in this case, and bands 1, 2 and 3 appear four times in the repeat while bands 4, 5, 6 and 7 appear only once. Hence as can be seen, for any of bands 1, 2 and 3, they occur again with only one intervening element, while the other bands occur with three intervening elements between adjacent ones of those bands. Hence if the image pixels are each spread over a two by two cluster, then there will not be full resolution image sampling at bands 4, 5, 6 and 7. This means the spatial resolution at these bands will drop, unless inter-band prediction mechanisms can be applied.

FIG. 11, Optical Duplication of Images

FIG. 11 shows a similar arrangement to that of FIG. 1 except that there are lenses or mirrors for optical duplication (20) so that multiple image copies are projected on different parts of the sensor array. This enables different magnifications, or enables the same part of the image to be detected twice at different bands or resolutions for example. The boundaries of the image copies might be set by a field stop or by physical barriers.

Design for Optical Fall-Off and Module Sensitivity

When designing the integrated module, consisting of both the image sensor array and the filter structure, cross-component optimizations can be done. For modules targeting low-cost and/or compact systems, lower quality optics can be expected. One effect which can be tackled in this context, is vignetting. Vignetting is a reduction of an images brightness or saturation at the periphery compared to the image center. When this effect is coupled to the wavelength dependent efficiency of the Fabry-Perot filter and image sensor, both effects can be co-optimized in order to flatten the wavelength dependent behavior, instead of strengthening it.

Both effects, vignetting and sensor sensitivity, affect the efficiency of the module for a certain arrangement of the filters. In order to flatten the sensitivity and overcome this additive behavior of both effects, a suitable choice of arrangement of the filters and the design of the array of lenses can be made that takes both effects into account. This can be combined with illumination profiles, if needed, and when the application permits.

As has already been discussed in the foregoing paragraphs, one part of the design of the hyperspectral imaging module, is the arrangement of the different filters over the image sensor array. In general, the design process can be split into the following parts:

1. selection of the targeted wavelength ranges,
2. selection of an image sensor array for that range,
3. selection of the targeted spectral sampling (and spectral resolution),
4. design of the image copies by designing the array of lenses, and
5. design of the different Fabry-Perot filters and their arrangement in the array.

FIGS. 12 and 13, Steps in Methods of Operation of the Cameras

FIGS. 12 and 13 show steps in methods of operation of the cameras. In FIG. 12, not shown is any preliminary registration if needed for example in some cases to set outlines of the image copies, for example by mechanical adjustment of the objective lens or other optical component, or of the location of the sensor array. Step 410 is the read out from the sensor array of the detection signals of each image pixel at the different passbands, in one frame time. Step 420 is reading out and storing these signals as values in a database to represent assembling the image cube for that instant, or for a number of instants. FIG. 13 is similar to FIG. 12 with the addition of the step 425 of processing the read out to detect amounts of unwanted order signals and to remove such unwanted components by subtraction from some of the pixel values as discussed above.

With any of the embodiments described, there can be additional sampling over multiple frame times if a spatial scanning mechanism is used to change the field of view or the angular position of the view in consecutive frame periods. This can extend the image cube or make it more dense in the spatial directions.

FIGS. 14 and 15, Method of Configuring Cameras During Manufacture

FIG. 14 shows steps in methods of configuring such cameras during manufacture, with step 510 showing selecting passbands and selecting the spatial arrangement of the passbands in clusters for each image pixel. Step 520 shows manufacturing the layers of the integrated filters according to the passbands and their spatial arrangement. FIG. 15 is similar to FIG. 14 except that step 510 is replaced by step 515 in which the selection of passbands and their spatial arrangement is such as to have some variation of which passbands are detected in different parts of the image cube, or variation of spatial or spectral resolution of the detection in different parts of the image cube.

FIG. 16, Integrated Fabry Perot Filters

FIG. 16 shows a cross section view of a sensor array 40 integrated with an array of Fabry Perot filters 31. This has a top semi mirror coating 33 and a bottom semi mirror coating 32. Although gaps are shown between the parts, this is for clarity and in practice there would be no gaps. More details of examples of this part are now set out.

Semiconductor Processing

The array of filters can be integrated with the image sensor array using semiconductor process technology, i.e. the spectral unit is post processed on the substrate comprising the image sensor array using semiconductor process technology and process steps. Examples of such semiconductor technology are Complementary-Metal-Oxide-Semiconductor (CMOS) processing, whereby the image sensor array is a CMOS sensor, and Charge-Coupled-Device (CCD) processing, whereby the image sensor array is a CCD sensor. These manufacturing techniques are ideally suited for producing integrated electronic circuits. Such monolithic integration allows manufacturing at low cost while offering a higher performance as no interface layers are needed to attach the spectral unit to the substrate. Hence stray light effects are considerably reduced.

Given the large range of technology generations, one can choose to manufacture the sensor in a lower cost technology having a large critical dimension (CD), e.g. 130 nm, resulting a larger pixels and smaller spatial resolution of the image sensor array. Alternatively one can choose to manufacture the image sensor array in a state in a higher cost technology having a smaller critical dimension (CD), e.g. 45 nm, resulting a smaller pixels and higher spatial resolution of the image sensor array.

The image sensor array can be a front-illuminated sensor, whereby the array of filters is post processed on top of the substrate comprising the sensor. Optionally this substrate is thinned afterwards thereby removing the bulk of the substrate and leaving a thin slice containing the image sensor array and the spectral unit monolithically integrated therewith. Alternatively the image sensor array can be a back-illuminated sensor, whereby first the substrate comprising the sensor is thinned from the backside onwards. On backside the thinned substrate the spectral unit is then post processed.

Although any order of Fabry-Perot filters can be manufactured and used, preferably only 1st order Fabry-Perot filters are formed on the image sensor array thereby reducing the complexity for removing and/or blocking higher order components. A monolithically integrated hyperspectral imaging system with a 1st order Fabry-Perot filter array typically does not require a focusing lens in the optical subsystem.

Examples of complete hyperspectral imaging systems comprising the optical subsystem and the monolithically integrated array of filters and image sensor array are disclosed. These complete imaging systems exploit from the benefits of the monolithically integration to allow freedom in designing the optical subsystem.

The design of the filters, e.g. the thickness which defines the cavity length of the filters, can take into account the location of the particular filter on the chip to reduce the dependency on variations in the incident angle of the incoming electromagnetic spectrum.

The filter is post-processed on top of an image sensor array and every filter is aligned with the rows or columns of the image sensor array.

The filters can be monolithically integrated, meaning that the filter structures are directly post-processed on top of the image sensor. This integration has very important advantages and some consequences, compared to filter structures that are separately produced and then assembled with the imager later. Advantages of monolithic integration are cost reduction through standard CMOS production steps, reduction in stray light, allow design for first order and avoid the need for a focusing lens.

When compared to a hybrid integration, in which the filter structures are separately produced and then assembled with the image sensor into the hyperspectral module, there are some advantages to a monolithic integration. Firstly, the combination of both production sequences into one combined flow leads to an overall simplification and cost reduction in the production, when compared to a hybrid integration of the filter structures that are separately produced and then later assembled with the sensor into the module. This is especially the case for this filter, as the post-production of the filter structures requires only CMOS compatible fabrication steps, like deposition, patterning and etching. By adding these steps to the normal production flow of the image sensor, expensive, error prone and labor intensive assembly steps are prevented. For example, for a filter with 3 layers of oxide and amorphous silicon in a Bragg stack and 127 different thicknesses in the cavity, around 50 lot-turns are needed, giving an additional cost of more or less 20% with respect to standard CMOS imagers. The number of lot turns for the deposition of the top and bottom mirror layers can even be reduced if the different layers can be deposited, one after the other, in the same tool.

Secondly by manufacturing the filter structure directly on top of the pixels of the imager, photons can pass directly from the filter into the pixel below. In the case of front side illuminated sensors, photons will first pass through the metallization layers and some dielectric layers. When the filter structure is produced separately and stacked on top of the image sensor, there will always be a non-functional layer or gap in between both structures.

Even when the filter and substrate combination is flipped and the filter is located in between the supporting substrate and the image sensor, the light will pass through the substrate first, then through the filter and finally through a thin air or glue gap, before it hits the image sensor photodiodes. When a filter structure is combined with an image sensor, be it stacked on top of each-other with air or glue between the different layers, this extra substrate between the filter structure and the underlying rows of pixels will always give rise to a certain amount of performance degradation because of:

1. Cross Talk

Photons that exit the filter structure above a certain pixel can cross the gap and fall onto a neighboring pixel. This effect will be heavily reduced when the gap is reduced or completely removed by a direct postprocessing of the filter onto the pixels. There can still be some cross-talk as a result of the thickness of the filter itself however, as a photon that enters the filter above one pixel can still propagate through the filter and fall onto a neighboring pixel. This is reduced by designing thinner filters and by controlling the angle of incidence.

2. Stray Light

The extra non-functional layer gives rise to extra reflections on its boundaries if the refractive indices are not matched and therefore to extra stray light on top of the cross-talk discussed above. By reducing the effective distance S between the filter and the pixel array of the image sensor for different incident angles stray light is reduced. For a smaller distance S, e.g. 1 nm, the distance that is traveled by the stray light (D) is well within normal pixel dimensions (e.g. 1 to 15_m). This is not the case for more macroscopic integration distances, e.g. 1 mm substrate, in which case the distance of the traveled light D ranges over tens to hundreds of pixels, leading to a severe deterioration of the spatial and spectral resolution. In some cases, the distance D can become so large, an additional focus lens is required to focus the light back onto the pixel.

3. Parasitic Fabry-Perot Arising Because of the Stray Light

Additionally, as indicated in the previous item, the dielectric stack and metals on top of the photodiodes reflect part of the light. Together with the gap because of the heterogeneous integration and the bottom mirror of the cavity, this forms a parasitic Fabry-Perot interfering with the actual one. This process can be optimized with the monolithic integration as the dielectric layers in the imager become part of the bottom Bragg stack, made in similar materials (e.g. oxide) and which is not very sensitive to the width of these layers.

One important reason why the hybrid filter structures that are post-production assembled onto the image sensors suffer from this problem, is the fact that the construction of very thin filter structures separately, requires the additional insertion of a (transparent) support structure to mechanically support the filters and enable the stacking. When this layer is placed between the filter and the image sensor, the non-functional gap consists of this layer and an additional air or glue gap in between the support layer and the image sensor. When the support structure is placed on top, it can also generate additional reflections and should be optimized separately (e.g. by adding anti-reflective coatings), but still there will be an air or glue layer in between the filter and the image sensor. All of this can be made redundant by post-processing the filter structures directly on top of the image sensor, as has been discussed above.

A third advantage is that the monolithic integration, combined with very precise CMOS fabrication techniques, enables the construction of filter structures with much smaller thicknesses. As discussed later, the Fabry-Perot filter structure is designed to select a certain wavelength by tuning the cavity length. Thinner filters are less sensitive to the incident angle, as the internal reflections in the filters cover less distance for non-perpendicular incidence. A thicker filter will suffer from a larger displacement D of the transmitted beams, ranging well over 10 mm. This leads to a severe reduction in spatial and spectral resolution, as the light that passes through the filters will fall onto other rows or columns of pixels. This macroscopic filter hence requires a focusing lens. The thin filters are much less sensitive to this and the displacement D stays in most cases below the pixel dimensions, i.e. preferably in the 1 to 10 nm range, for all but the largest angles of incidence and the smallest pixels sizes. Traditional production techniques, in combination with hybrid integration of the filter structure and the image sensor, can not reach the required accuracy to fabricate Fabry-Perot filters of the first order. Hence, higher order Fabry-Perot structures have to be used. In that case, additional dichroic or other filters have to be added to the module, in order to select the required order only. This gives rise to additional energy loss, additional costs and hence reduced overall system optimality.

Finally, when a Fabry-Perot filter is placed some distance away from the image sensor, the output of the filter exhibits phase differences that, when focused by a lens, take on the form of concentric circles. The concentric circles are a result of the different interfering waves where you have at different locations constructive and destructive interference. The focusing lens is needed for macroscopic filters because of the large distances covered by reflections inside the filter and in order to focus all these reflections back onto one pixel. In the disclosed integrated imaging module, the distance between the filter structure and the image sensor is very small and as the filter is designed for the first order, there is no need for a focusing lens. Thin filters don't need this focusing lens, because internal reflections cover much smaller distances and in the case of the proposed filter, all light still falls in one pixel (after a very large number of internal reflections, the energy that is left in the light ray that exceeds the size of a single pixels is negligible). The concentric circles that are the result of the phase difference, will still be there, but will all be focused inside the same pixel and their effect is all integrated in the output of that pixel.

The direct post-processing of the filter structure on top of an active IC, in this case the image sensor, should be compatible with the contamination, mechanical, temperature and other limitations of that IC. This means that, for example, none of the steps used in the fabrication of the filter can use materials or processing steps that would damage the image sensor below.

As will be discussed below, one of the most important limitations is the restriction on the available materials, taking into account the CMOS production environment. In the proposed filter, the material selection has been done such that standard materials have been used, that are fully compatible with standard processing. Using some materials is not possible, e.g. Au or Ag, as they tend to diffuse into the different layers and into the tools and thereby negatively affect the yield of the current and even future processing steps. In some cases, such a layer can still be acceptable as a final step (top layer), when the deposition is done outside of the normal processing line and when the tool is only used for that purpose. This can only be done as a final step, as the wafer can not enter the normal flow after this operation. Another limitation, related to the material selection, is the temperature budget or the temperature window that is still available for processing. In order to perform the post-processing without damaging the image sensor. To prevent damage, the maximal temperature of the processing steps should not exceed a certain maximum, e.g. 400 degrees C. This also restricts the choice of materials and crystallization that is available for the design. With respect to a hybrid approach, where the image sensor and a separately produced filter structure are assembled into a module later, there is less freedom here. In case of a monolithic design, the restrictions have to be taken into account throughout the design. If certain design choices can be made during the design of the image sensor itself, to relax the constraints on the processing of the filter (e.g. to raise the allowed temperature for post-processing), this can be taken into account too. This then leads to an optimization problem at the module level, instead of for the image sensor and the filter structures separately. The restriction on the filter structures always apply, as it is processed later and on top of the image sensor.

Fabry-Perot Filter

Every pixel of the image sensor can have its own optical filter, sensitive to one specific wavelength. The organization of different optical filters on the sensor depends on its usage. Different types of filters exist which can be integrated, such as dichroic filters. The type that is used in the examples described is the Fabry-Perot Interferometer.

A Fabry-Perot filter is made of a transparent layer (called cavity) with two reflecting surfaces at each side of that layer. Fabry-Perot wavelength selection involves multiple light rays within the cavity being reflected, which results in constructive and destructive interference, based on the wavelength of the light, on the distance l between the semi-mirrors and on the incident angle θ. (b) Higher orders are also selected, which results in an order selection problem. The filter operation is based on this well-known Fabry-Perot principle, in which the height of each filter is selected to be tuned to the desired passband. Each filter is formed by a resonant cavity of which the resonance frequency is determined by the height of the filter. On the top and bottom of the cavity, a semi-transparent mirror is placed to partially reflect the light ray. Because of the reflections, an optical path difference is introduced resulting in destructive and constructive interference (depending on the incoming wavelength). More details of the principles and characteristics of such filters are set out in above mentioned International Patent Publication No. WO2011064403.

Design of the Optical Filter

Reflecting Surfaces:

The design and performance of the reflecting surfaces on both sides of the cavity are crucial to the performance of a Fabry Perot optical filter. A Fabry-Perot optical filter with high finesse, and thus good spectral resolution, can only be obtained by using highly reflective mirrors. A second important parameter of the mirrors is their absorption, as this will determine the efficiency of the filter. If a full range of Fabry-Perot optical filters has to be constructed over a certain wavelength range, it is beneficial that these two parameters (reflectivity and absorption) stay as constant as possible over this spectral range. In that case, the wavelength range can be covered/sampled by varying only the cavity length of the Fabry-Perot filters and the materials and mirror layers can be kept constant. The selected wavelength range has to match the sensitivity of the selected image sensor, which is the second component of the module Current solutions proposing monolithic Integration use specific non-standard sensor designs, increasing the cost or decreasing the speed. Switching to CMOS compatible processing steps on CMOS sensors raises integration issues as it has consequences on, for example, the material selection, due to contamination and temperature budget. Metals like Ag for the bottom mirror can not be used. State of the art Fabry-Perot filters needs to use Al, causing a serious decrease of the filter quality or optical throughput (speed). Dielectric stacks are preferred but the contamination level and temperature budget limits the material selection. Process compliant materials needed having the correct combination of n/k to obtain the needed spectral range in the selected frequency range. An example of these dielectric materials having low n material is $SiO_2$, possibly tuned to decrease n even further. An example of a high-n material is amorphous silicon, with reduced absorption index because of process parameter tuning, e.g. temperature and hydrogen content. Hard oxides have better tolerances but cannot be used because of the need for higher temperatures than allowed by standard CMOS processing.

An example of such alternative mirror system is a (distributed) Bragg stack, which is formed by combining two types of dielectrics into an alternating stack of two or more materials: one with a low refractive index and one with a high refractive index. A first characteristic of a Bragg stack is its bandwidth, as given by Equation 1, i.e. the spectral range $\Delta\lambda_o$ over which the reflectivity is more or less constant.

$$\Delta\lambda_0 = \frac{4\lambda_0}{\pi}\arcsin\left(\frac{n_2 - n_1}{n_2 + n_1}\right) \quad (1)$$

From this equation, it can be seen that the bandwidth $\Delta\lambda_o$ depends on both the central wavelength $\lambda$ and the refractive indices $n_1$, $n_2$ of the selected materials. To be able to cover a wide spectral range, around a certain central wavelength (e.g. 600 nm spectral range around 700 nm), a big difference between n1 and n2 is needed. From the list of materials that are used in standard semiconductor processing, $SiO_2$ has one of the lowest refractive indices (1.46) and a very low absorption coefficient. Both parameters are stable over a very large spectral range. For a spectral range of 600 nm around a central wavelength of 700 nm (the VNIR range), this means that the second material in the Bragg stack will ideally need to have refractive index equal to 6.4, in addition to an absorption coefficient as close as possible to 0. There is no such ideal material available in the standard IC processing materials, compatible with the process flow, and adapting existing materials for a better refractive index and lower absorption is needed. The refractive index of $SiO_2$ can be lowered by making it porous (mix it with air, which has a refractive index of 1). This results in a need for better manufacturable refractive index equal to 5 for the same spectral range and central wavelength. Another example of material engineering is lowering the absorption index of amorphous silicon by changing process (deposition) parameters, like temperature, concentration of hydrogen, etc.

$$R = \left[\frac{n_0(n_2)^{2N} - n_s(n_1)^{2N}}{n_0(n_2)^{2N} + n_s(n_1)^{2N}}\right]^2 \quad (2)$$

As indicated by Equation 2, the reflectivity R of such a Bragg mirror is easily controlled by the number of pairs of dielectric layers. The more layers, the higher the reflectivity and the higher the finesse of the Fabry-Perot filter that will be built with that particular mirror. In Equation 2, $n_0$ is the refractive index of the surrounding medium, $n_s$ is the refractive index of the substrate, $n_1$ is the refractive index of the first material, $n_2$ is the refractive index of the second material and N is the number of pairs in the Bragg stack. One instantiation of a distributed Bragg stack is a combination of $SiO_2$ and engineered amorphous Silicon for a central wavelength around 700 nm and a range from 540 nm to 1000 nm. A second instantiation is a combination of $SiO_2$ and SiGe for a central wavelength of 1500 nm and a bandwidth of 1000 nm, in casu from 1000 nm to 2000 nm. A consequence of using Bragg stacks for the mirror layers is an additional phase shift during the reflection of the light.

In use, the appearance of second order leakage is the result of the fact that a Fabry-Perot filter which is designed for wavelength $\lambda_j$ also passes incoming wavelengths that are a multiple of $\lambda_j$, called higher orders. However, only those higher order wavelengths that fall in the wavelength range for which both the Fabry-Perot filter and the underlying image sensor have a reasonable efficiency should be considered.

Manufacturing

Fabrication methods for manufacturing 1D or 2D Fabry-Perot filters can include successive patterning and etching steps which requires a large number of processing steps in order to produce k different thicknesses.

Planarity of the Image Sensor

In order to start with a well controlled state, it is important that the image sensor is planarized before the filter structure is built up. This can be done using a deposition step, followed by a CMP (Chemical Mechanical Polishing) step to remove all topography. By doing this, the rest of the processing does not depend anymore on the exact BEOL arrangements. The thickness and the material of this planarization layer can to some extent be taken into account during the design of the filter structure. However, this layer is not a part of the active filter structure and does not have a large effect on the filter itself, as long as the correct material transition (important for the refractive index) is correctly taken into account. As the Fabry-Perot filter will be deposited on top of this planarization layer, variation in this layer will be not propagated up, as long as the variation is sufficiently slow across the wafer (e.g. no sharp edges). As CMP is able to generate a surface with across wafer flatness and variations at the nanometer scale, this requirement can be fulfilled.

Deposition Tolerances and Other Variations

A variation in deposited thicknesses in the components of the Fabry-Perot filters, in casu the layers of the Bragg stack and the thickness of the cavity, will result in a mismatch between the designed filter and the produced filter. The effect of the variations on the thickness of the cavity is that: the thickness of all filters will be changed by more or less an equal amount, causing a shift of the spectral range to the right of the left of the theoretical design. This global shift in the selected wavelengths, either up or down, with respect to the designed filter location, can be tolerated if it is a small proportion of the spectral width of the passbands, which can be one of the design parameters.

In addition to the wafer-wide deposition tolerance, there can be etch tolerances and other intra-die variations as well as inter-die variations. Traditionally this is mitigated by binning, selecting certain devices for certain wavelength ranges.

In case the etch processes that are being used to define are non-directional processes, the sharp edges that form the transition between one filter and the next one, can show rounding. In some embodiments, the width of each filter can cover multiple columns of sensor elements, in other cases just one or two sensor elements, in which case such corner rounding may have more effect on the passband.

Alignment Tolerances

When using standard IC processing techniques, alignment of filter structures on top of rows/columns of pixels with dimension of several microns per pixels is well within the possibilities of the state of the art. Therefore, alignment at the top level is not very critical.

Processing Hardware

Some of the method steps discussed above for image processing for example, may be implemented by logic in the form of hardware or, for example, in software using a processing engine such as a microprocessor or a programmable logic device (PLD's) such as a PLA (programmable logic array), PAL (programmable array logic), FPGA (field programmable gate array).

An example of a circuit with an embedded processor may be constructed as a VLSI chip around an embedded microprocessor which may be synthesized onto a single chip with the other components. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for accessing external storage e.g. via data networks. FIFO buffers may be used to decouple the processor from data transfer through these interfaces. The interface can provide network connections, i.e. suitable ports and network addresses, e.g. the interfaces may be in the form of network cards.

Software

Software programs may be stored in an internal ROM (read only memory) and/or on any other non-volatile memory, e.g. they may be stored in an external memory. Access to an external memory may be provided by conventional hardware which can include an external bus interface if needed, with address, data and control busses. Features of the method and apparatus of the present invention may be implemented as software to run on a processor. In particular image processing in accordance with the present invention may be implemented by suitable programming of the processor. The methods and procedures described above may be written as computer programs in a suitable computer language such as C and then compiled for the specific processor in the embedded design. For example, the software may be written in C and then compiled using a known compiler and known assembler. The software has code, which when executed on a processing engine provides the methods and image processor for the present invention. The software programs may be stored on any suitable machine readable medium such as magnetic disks, diskettes, solid state memory, tape memory, optical disks such as CD-ROM or DVD-ROM, etc. Other variations can be envisaged within the claims.

What is claimed is:

1. A spectral camera for producing a spectral output, the spectral camera comprising:
an objective lens for producing an image;
a mosaic of Fabry-Perot filters for passing different bands of the optical spectrum; and
one or more sensor arrays arranged to detect pixels of the image at the different bands passed by the filters, wherein for each of the image pixels, the one or more sensor arrays has a cluster of sensor elements for detecting the different bands, and wherein for each of the image pixels, the mosaic has a cluster of filters of different bands corresponding to the cluster of sensor elements, the clusters of filters being arranged in a repeating pattern across the one or more sensor arrays, each filter being integrated on one of the sensor elements so that the image can be detected simultaneously at the different bands to provide the spectral output, a bottom mirror of each Fabry-Perot filter arranged on top of one sensor element so that photons from the objective lens pass sequentially through a top mirror, a cavity, and the bottom mirror of the Fabry-Perot filter before passing into the one sensor element, and wherein the cluster of filters is directly illuminated through a single optical channel of the objective lens and with a single entrance pupil at a fixed location relative to the scene during spectral cube acquisition.

2. The spectral camera of claim 1, wherein at least some of the Fabry Perot filters are first order filters.

3. The spectral camera of claim 1, wherein some of the clusters comprise one or more additional sensor elements and corresponding filters arranged to detect bands corresponding to unwanted higher or lower order spectral response of another of the filters.

4. The spectral camera of claim 1, wherein the selections of bands in some of the clusters are arranged so that there is variation in any one or more of: which passbands are detected at different parts of the image, spectral range at different parts of the image, spectral resolution, spatial resolution at different parts of the image, and spatial resolution at different passbands.

5. The spectral camera of claim 1, wherein the mosaic of filters is monolithically integrated onto a top surface of the one or more sensor arrays.

6. A method of operating a spectral camera to produce a spectral output, the camera having an objective lens for producing an image, a mosaic of Fabry-Perot filters for passing different bands of the optical spectrum, and one or more sensor arrays arranged to detect pixels of the image at the different bands passed by the filters, wherein for each of the image pixels, the one or more sensor arrays has a cluster of sensor elements for detecting the different bands, and wherein for each of the image pixels, the mosaic has a cluster of filters of different bands corresponding to the cluster of sensor elements, the clusters of filters being arranged in a repeating pattern across the one or more sensor arrays, each filter being integrated on one of the sensor elements so as to provide each of the sensor elements with their respective one of the different bands so that the image can be detected simultaneously at the different bands, a bottom mirror of each Fabry-Perot filter arranged on top of one sensor element so that photons from the objective lens pass sequentially through a top mirror, a cavity, and the bottom mirror of the Fabry-Perot filter before passing into the one sensor element, and wherein the cluster of filters is directly illuminated through a single optical channel of the objective lens and with a single entrance pupil at a fixed location relative to the scene during spectral cube acquisition, the method comprising:

reading out the detections of the image pixels at the different bands from the sensor array; and processing the read out to assemble detected image copies for each of the bands.

7. The method of claim 6, further comprising processing the read out to detect unwanted orders and to remove them.

8. A method of configuring a spectral camera during manufacture, the spectral camera having an objective lens for producing an image, a mosaic of Fabry-Perot filters for passing different bands of the optical spectrum, and one or more sensor arrays arranged to detect pixels of the image at the different bands passed by the filters, wherein for each of the image pixels, the one or more sensor arrays has a cluster of sensor elements for detecting the different bands, and wherein for each of the image pixels, the mosaic has a cluster of filters of different bands corresponding to the cluster of sensor elements, the clusters of filters being arranged in a repeating pattern across the one or more sensor arrays, each filter integrated on one of the sensor elements so as to provide each of the sensor elements with their respective one of the different bands so that the image can be detected simultaneously at the different bands, a bottom mirror of each Fabry-Perot filter arranged on top of one sensor element so that photons from the objective lens pass sequentially through a top mirror, a cavity, and the bottom mirror of the Fabry-Perot filter before passing into the one sensor element, and wherein the cluster of filters is directly illuminated through a single optical channel of the objective lens and with a single entrance pupil at a fixed location relative to the scene during spectral cube acquisition, the method comprising:

selecting which passbands to use and selecting their spatial arrangement for the clusters; and making the integrated filters by forming layers on the sensor arrays according to the selected passbands and their spatial arrangement.

\* \* \* \* \*